(12) United States Patent
Kimura

(10) Patent No.: US 12,717,120 B2
(45) Date of Patent: Aug. 25, 2026

(54) ZOOM LENS AND IMAGING APPARATUS INCLUDING THE SAME

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 496 days.

(21) Appl. No.: 18/490,639

(22) Filed: Oct. 19, 2023

(65) Prior Publication Data

US 2024/0134166 A1 Apr. 25, 2024
US 2024/0231055 A9 Jul. 11, 2024

(30) Foreign Application Priority Data

Oct. 24, 2022 (JP) ................................ 2022-170052

(51) Int. Cl.
*G02B 13/00* (2006.01)
*G02B 9/62* (2006.01)
*G02B 13/02* (2006.01)

(52) U.S. Cl.
CPC ............ *G02B 13/005* (2013.01); *G02B 9/62* (2013.01); *G02B 13/02* (2013.01)

(58) Field of Classification Search
CPC .. G02B 13/005; G02B 13/02; G02B 15/1461; G02B 15/22; G02B 15/173; G02B 15/1431; G02B 15/1441; G02B 15/1451; G02B 15/16; G02B 15/20; G02B 9/62; H04N 23/55
See application file for complete search history.

(56) References Cited

U.S. PATENT DOCUMENTS

2017/0176728 A1 6/2017 Yamanaka
2017/0192212 A1 7/2017 Yamamoto
2019/0302431 A1* 10/2019 Kawamura .......... G02B 15/163
2021/0278642 A1 9/2021 Koga
2022/0035144 A1* 2/2022 Iwamoto ........ G02B 15/144113

FOREIGN PATENT DOCUMENTS

EP 3945357 A1 2/2022
JP 2009086537 A 4/2009
JP 2015138178 A 7/2015

* cited by examiner

*Primary Examiner* — Travis S Fissel
(74) *Attorney, Agent, or Firm* — Canon U.S.A., Inc. IP Division

(57) ABSTRACT

A zoom lens comprises a first lens unit having positive refractive power, a second lens unit having negative refractive power, and a rear lens group including one or more lens units. The first lens unit, the second lens unit, the rear lens group are arranged in order from an object side to an image side. Intervals between adjacent lens units change during zooming. The first lens unit is configured to move toward the object side during zooming from a wide angle end to a telephoto end. The second lens unit includes three or more lenses. The zoom lens satisfies predetermined inequalities.

22 Claims, 11 Drawing Sheets

L0
LR
L1
L2
L3
L4
L5
L6
IP
SP
IS
FOCUS
A
B

L0
LR
L1
L2
L3
L4
L5
L6
IP
SP
A
B
FOCUS
IS

L0
LR
L1
L2
L3
L4
L5
IP
SP
A
B
IS
FOCUS

L0
LR
L1
L2
L3
L4
L5
IP
SP
FOCUS
IS
A
B

L0
LR
L3
L1
L2
IP
SP
IS
FOCUS
A
B

ZOOM LENS AND IMAGING APPARATUS INCLUDING THE SAME

BACKGROUND OF THE INVENTION

Field of the Invention

The present invention relates to a zoom lens, and is suitable for imaging apparatuses, such as a digital video camera, a digital still camera, a broadcasting camera, and a silver-halide film camera.

Description of the Related Art

In recent years, there has been a demand that a zoom lens used as an imaging optical system for an imaging apparatus is small in size and weight and offers high optical performance over an entire zoom range while achieving a long focal length at a telephoto end.

Japanese Patent Application Laid-Open No. 2009-86537 discusses a zoom lens in which a first lens unit is fixed during zooming and a second lens unit having negative refractive power is moved toward an image side during zooming from a wide angle end to a telephoto end. In this zoom lens, to achieve a long focal length at the telephoto end, it is necessary to increase an overall lens length at the wide angle end in order to secure a moving amount of the second lens unit during zooming.

SUMMARY OF THE INVENTION

According to an aspect of the present invention, a zoom lens comprises a first lens unit having positive refractive power, a second lens unit having negative refractive power, and a rear lens group including one or more lens units, the first lens unit, the second lens unit, and the rear lens group being arranged in order from an object side to an image side. Intervals between adjacent lens units change during zooming. The first lens unit is configured to move toward the object side during zooming from a wide angle end to a telephoto end. The second lens unit includes three or more lenses. The following inequalities are satisfied:

$$4.3<TD12t/TG12<12.0, \text{ and}$$

$$3.6<TD1/TD2<30.0,$$

where TD12t is a distance on an optical axis from a lens surface arranged closest to the object side in the first lens unit to a lens surface arranged closest to the image side in the second lens unit at the telephoto end, TG12 is a total sum of thicknesses, on the optical axis, of lenses included in the first lens unit and the second lens unit, TD1 is a distance on the optical axis from the lens surface arranged closest to the object side in the first lens unit to a lens surface arranged closest to the image side in the first lens unit, and TD2 is a distance on the optical axis from a lens surface arranged closest to the object side in the second lens unit to the lens surface arranged closest to the image side in the second lens unit.

Further features of the present invention will become apparent from the following description of exemplary embodiments with reference to the attached drawings.

DESCRIPTION OF THE EMBODIMENTS

Figure 1:
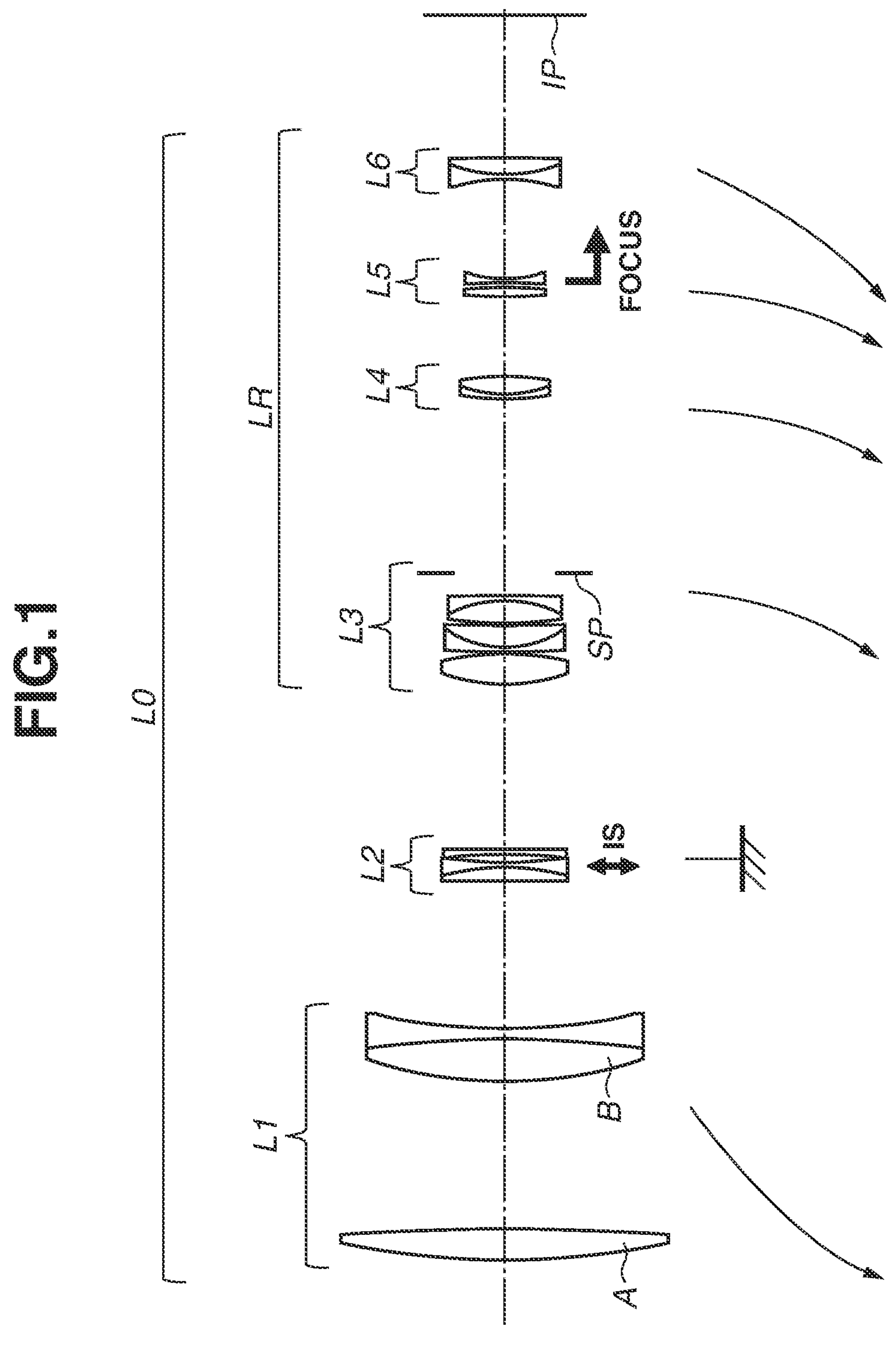
FIG. 1 is a cross-sectional view illustrating lenses at a wide angle end of a zoom lens according to a first exemplary embodiment.
Figure 2A:
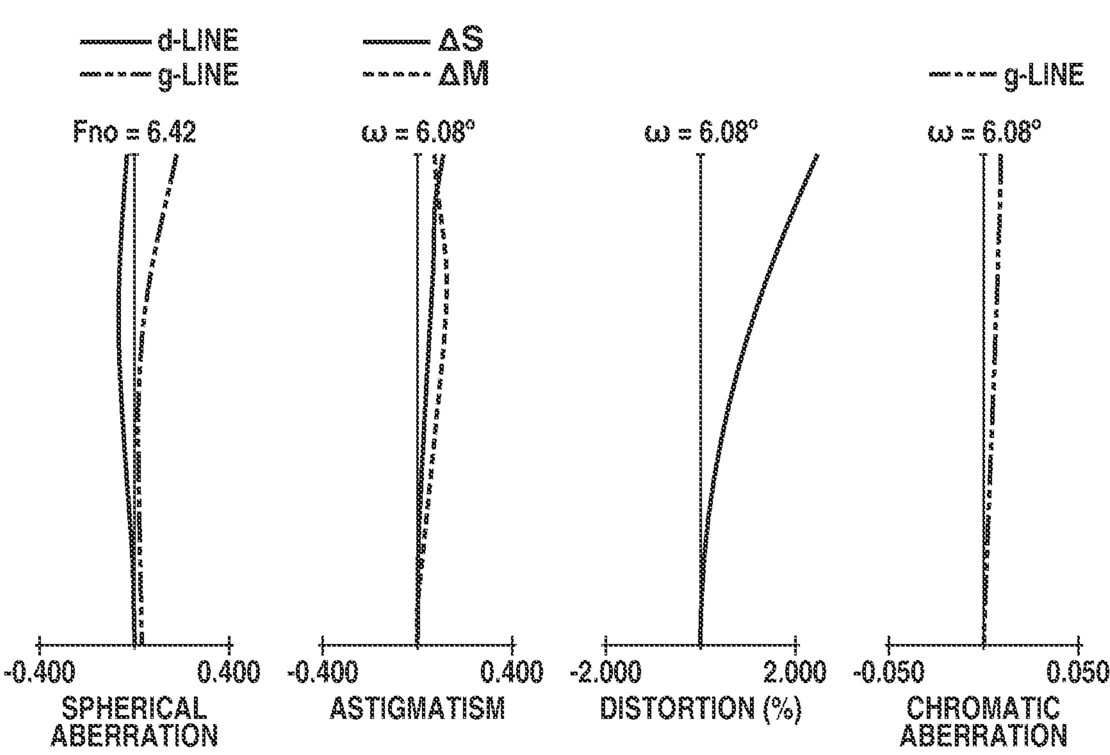
FIG. 2A is an aberration diagram at the wide angle end of the zoom lens according to the first exemplary embodiment.
Figure 2B:
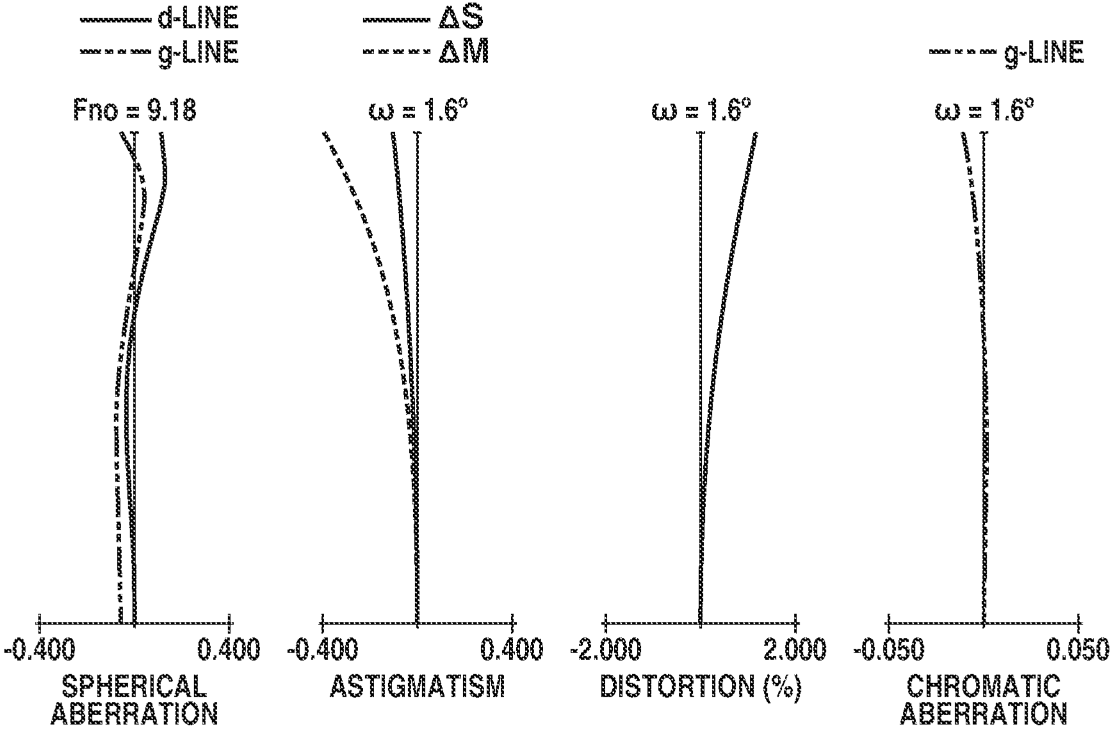
FIG. 2B is an aberration diagram at a telephoto end of the zoom lens according to the first exemplary embodiment.
Figure 3:
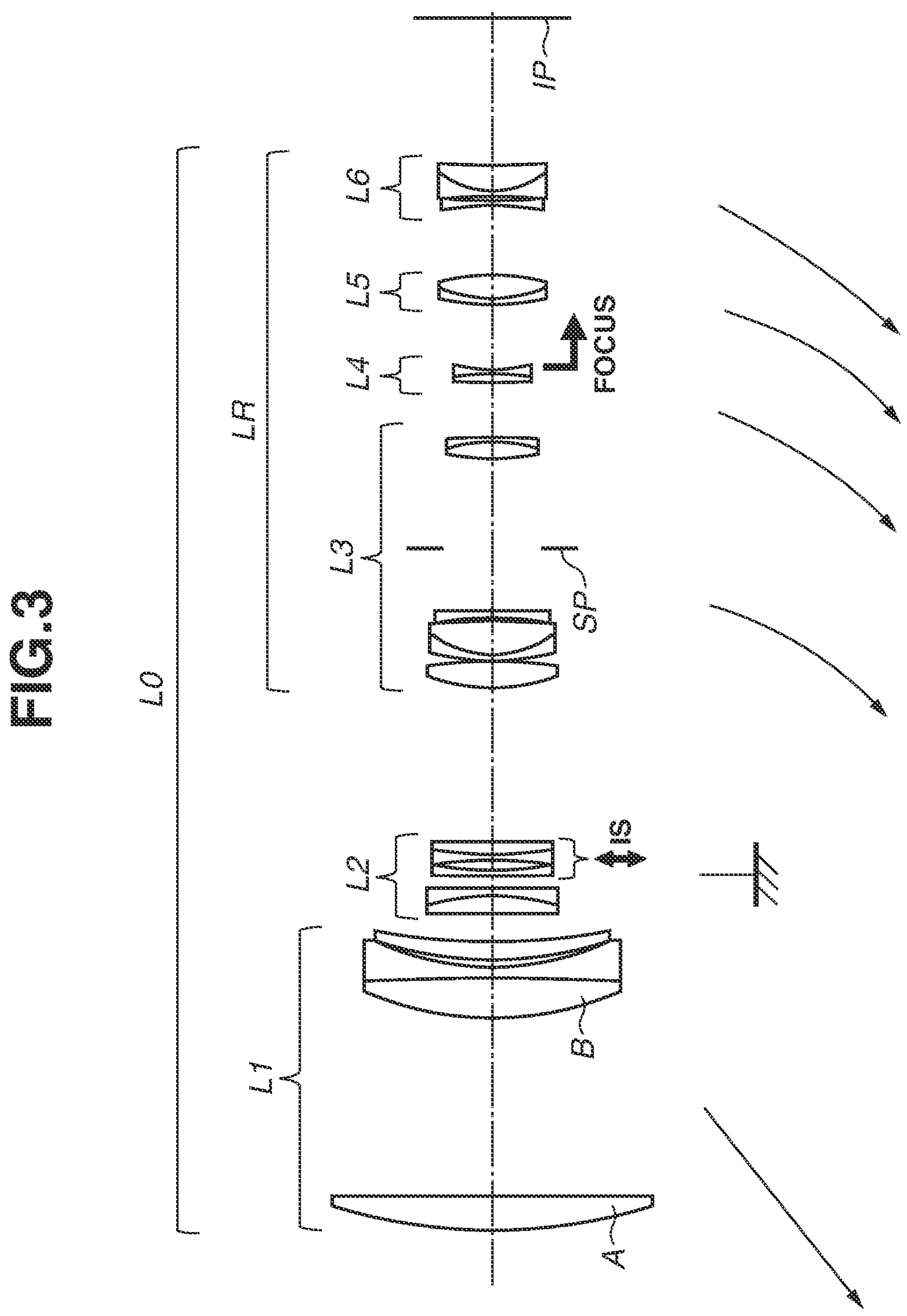
FIG. 3 is a cross-sectional view illustrating lenses at a wide angle end of a zoom lens according to a second exemplary embodiment.
Figure 4A:
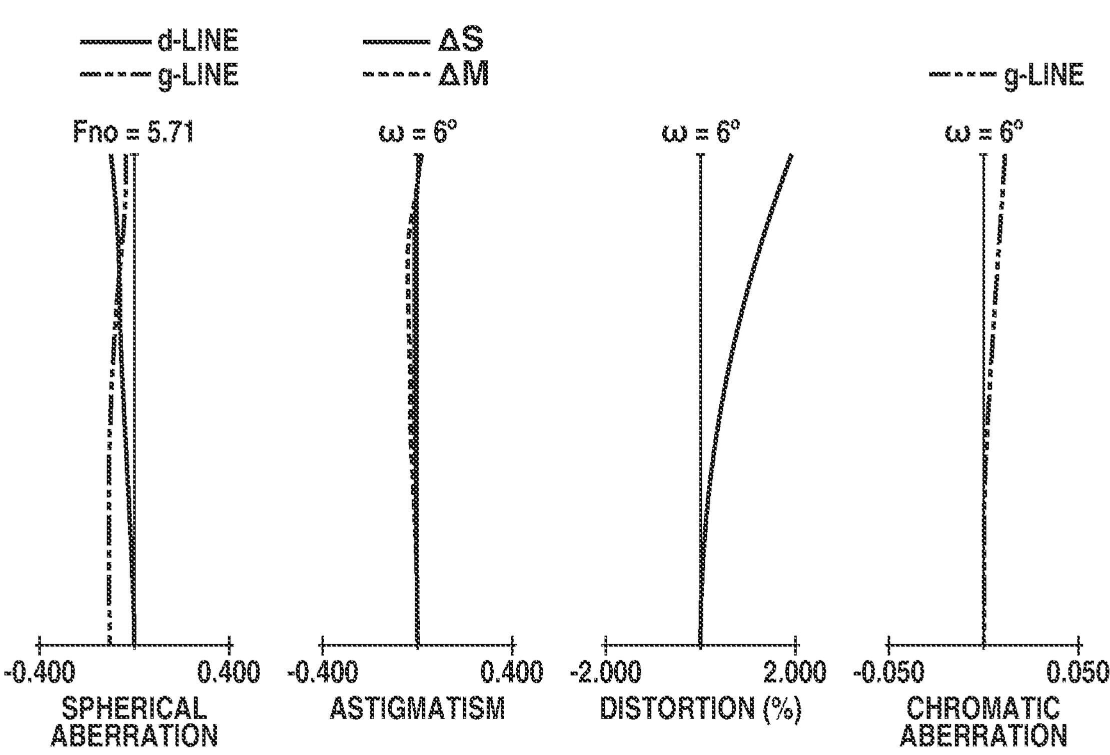
FIG. 4A is an aberration diagram at the wide angle end of the zoom lens according to the second exemplary embodiment.
Figure 4B:
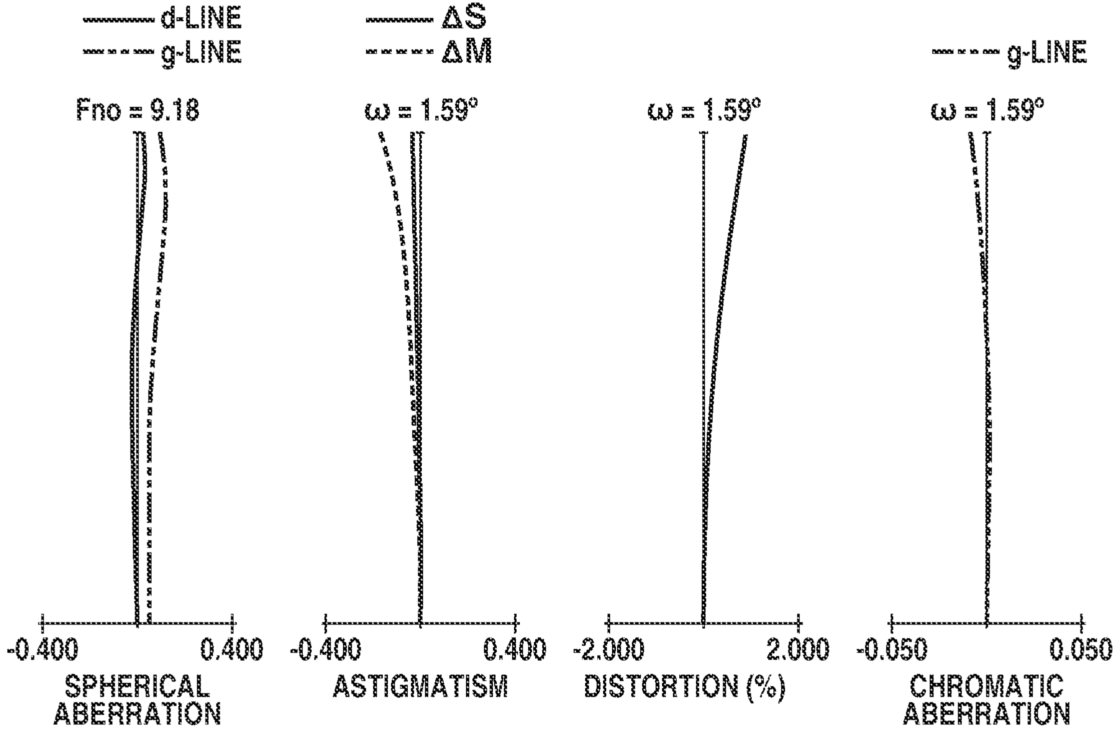
FIG. 4B is an aberration diagram at a telephoto end of the zoom lens according to the second exemplary embodiment.
Figure 5:
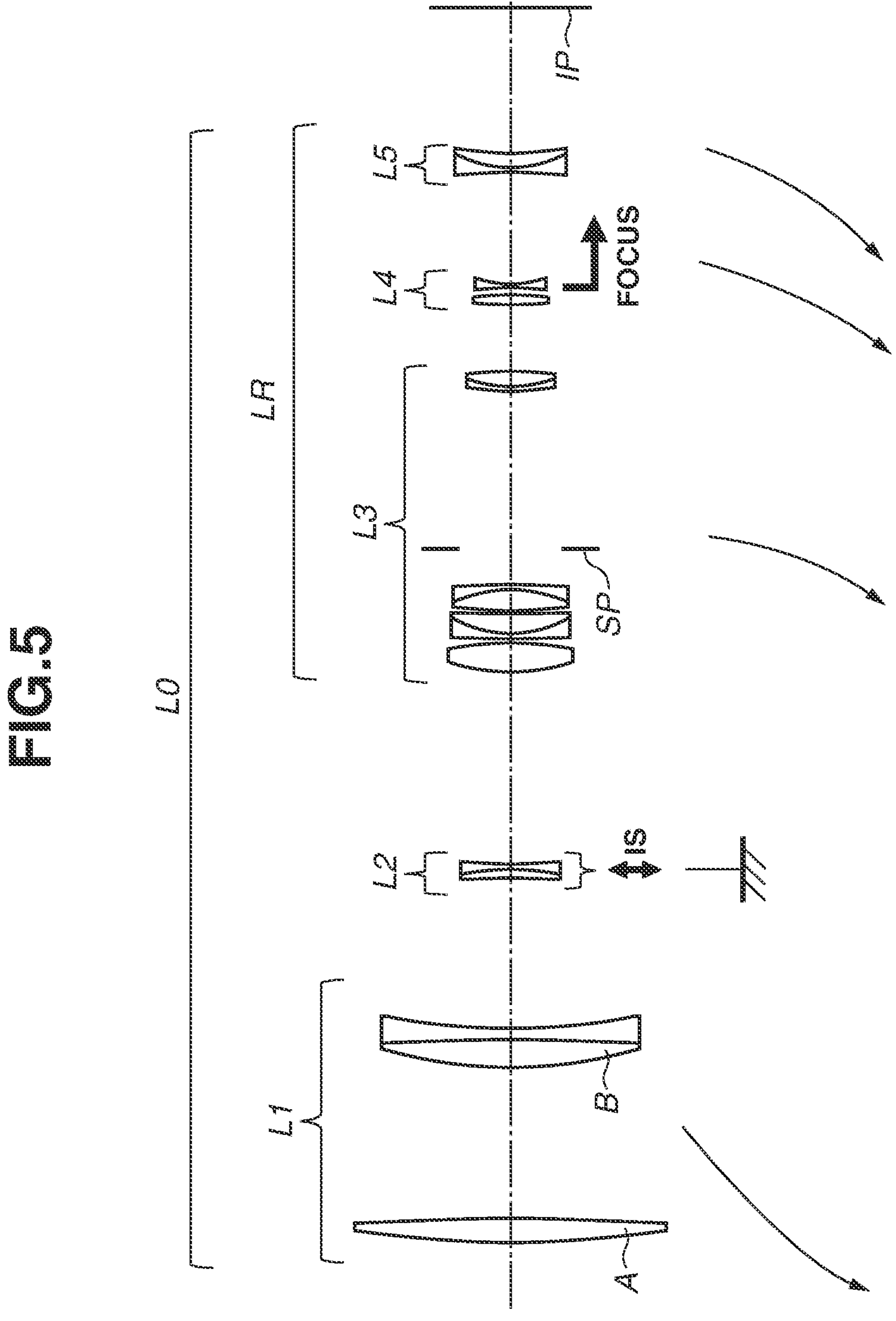
FIG. 5 is a cross-sectional view illustrating lenses at a wide angle end of a zoom lens according to a third exemplary embodiment.
Figure 6A:
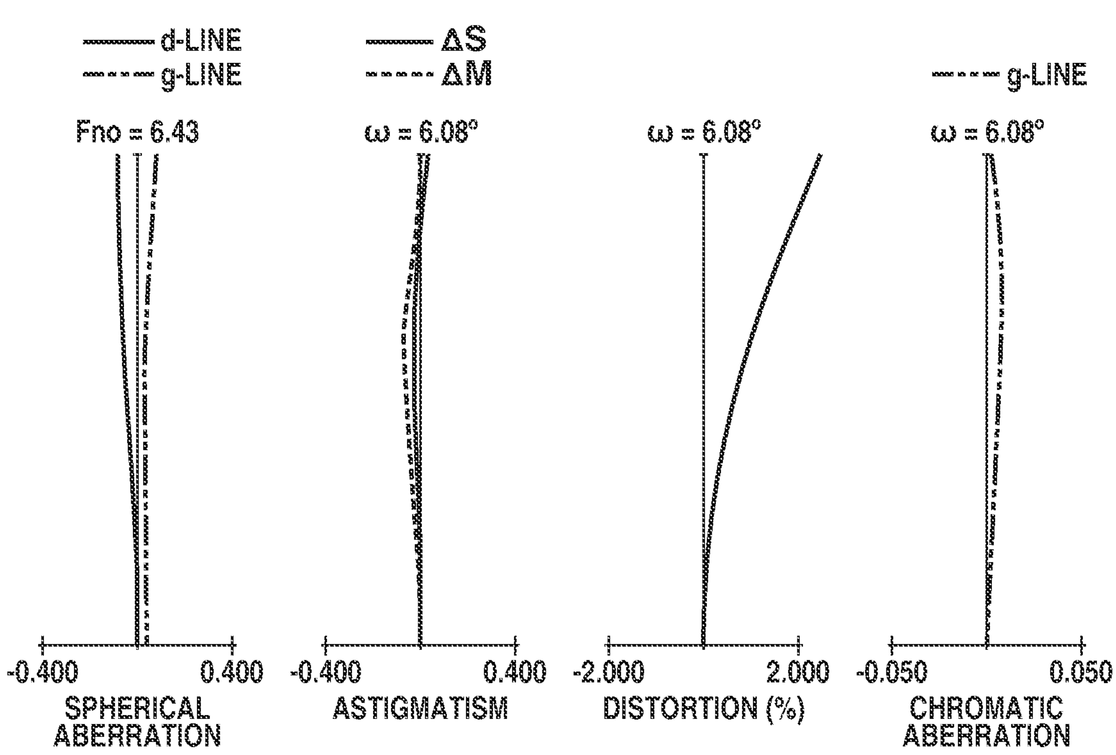
FIG. 6A is an aberration diagram at the wide angle end of the zoom lens according to the third exemplary embodiment.
Figure 6B:
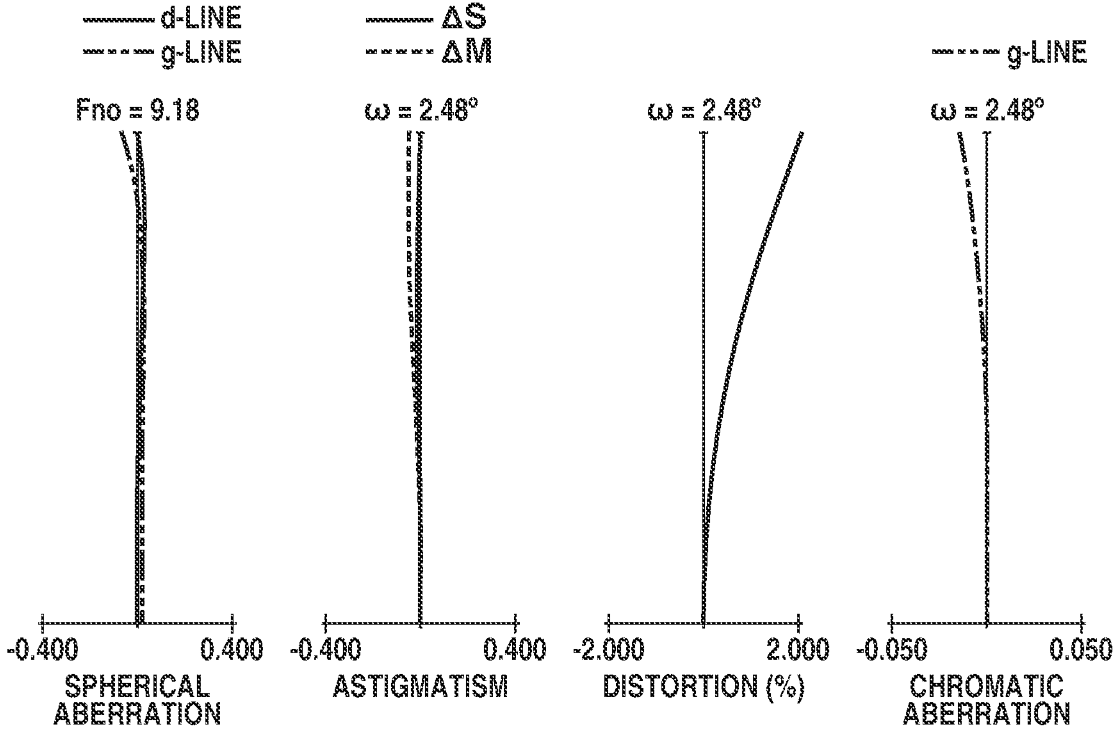
FIG. 6B is an aberration diagram at a telephoto end of the zoom lens according to the third exemplary embodiment.
Figure 7:
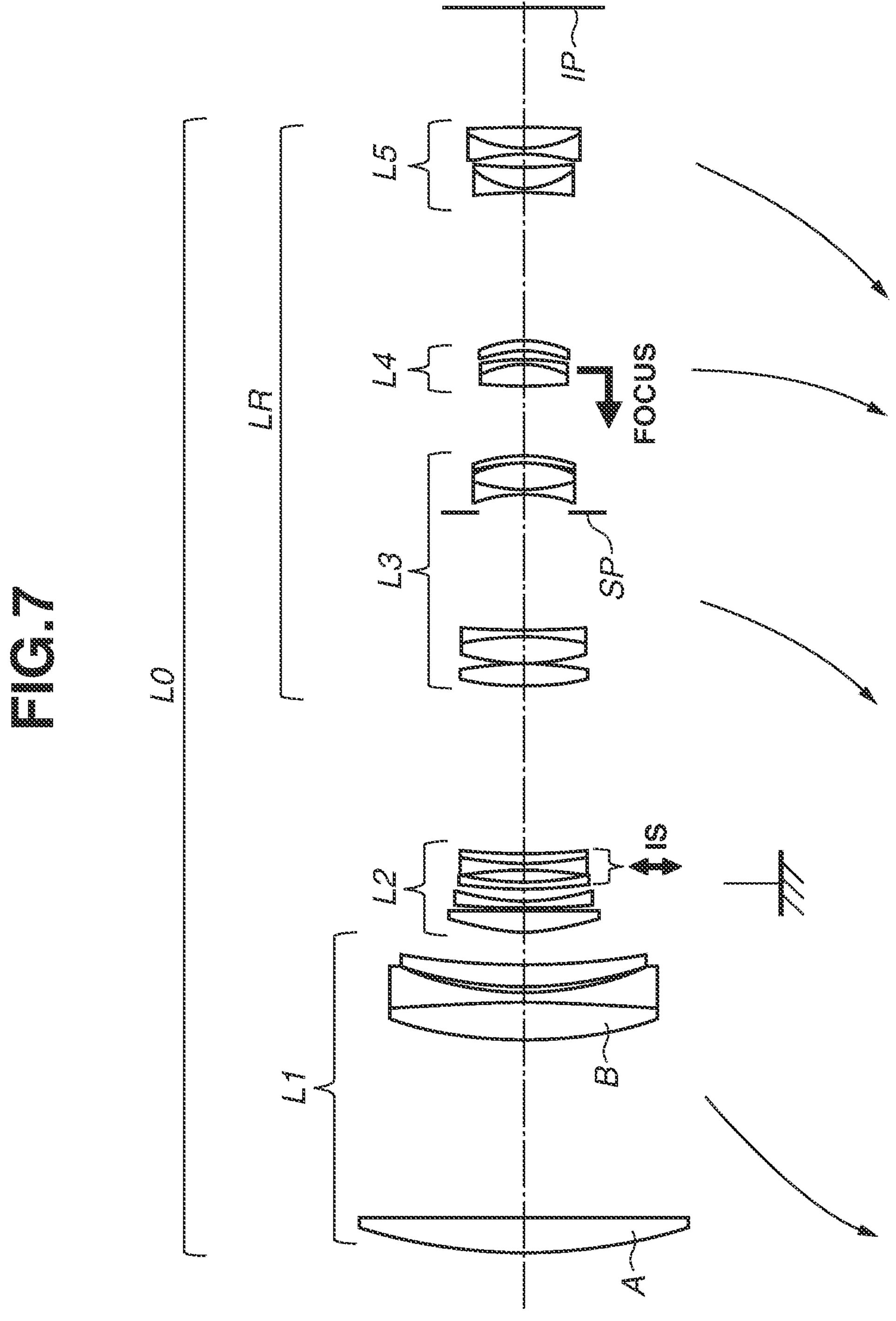
FIG. 7 is a cross-sectional view illustrating lenses at a wide angle end of a zoom lens according to a fourth exemplary embodiment.
Figure 8A:
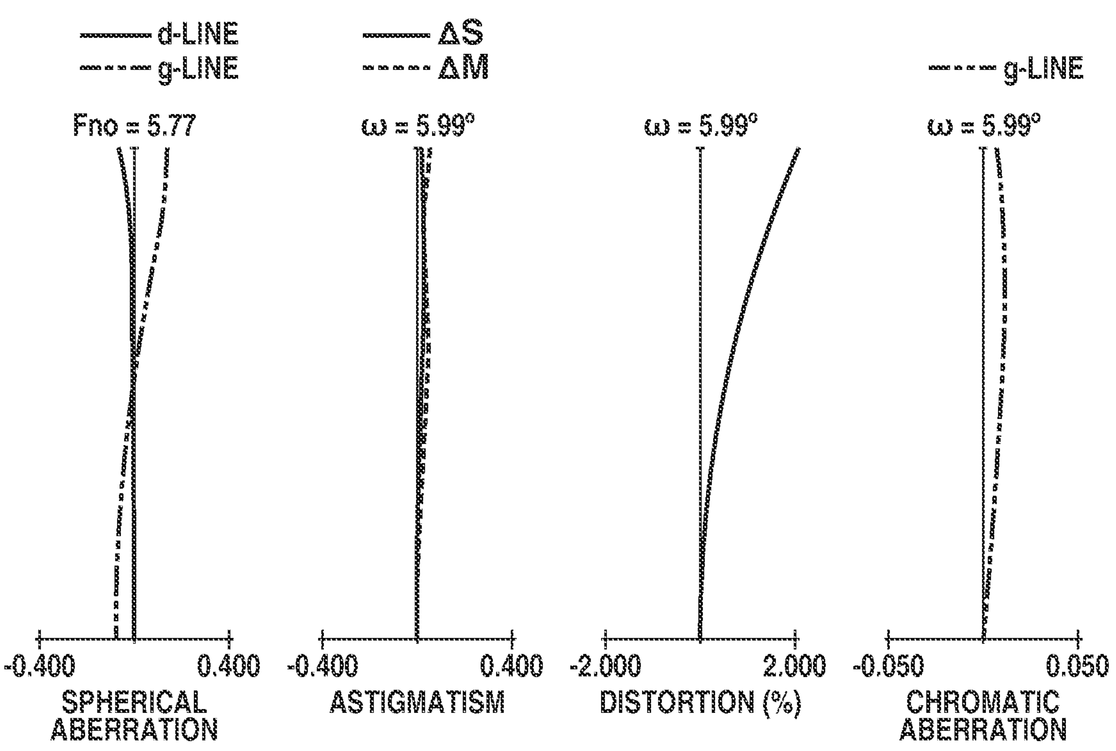
FIG. 8A is an aberration diagram at the wide angle end of the zoom lens according to the fourth exemplary embodiment.
Figure 8B:
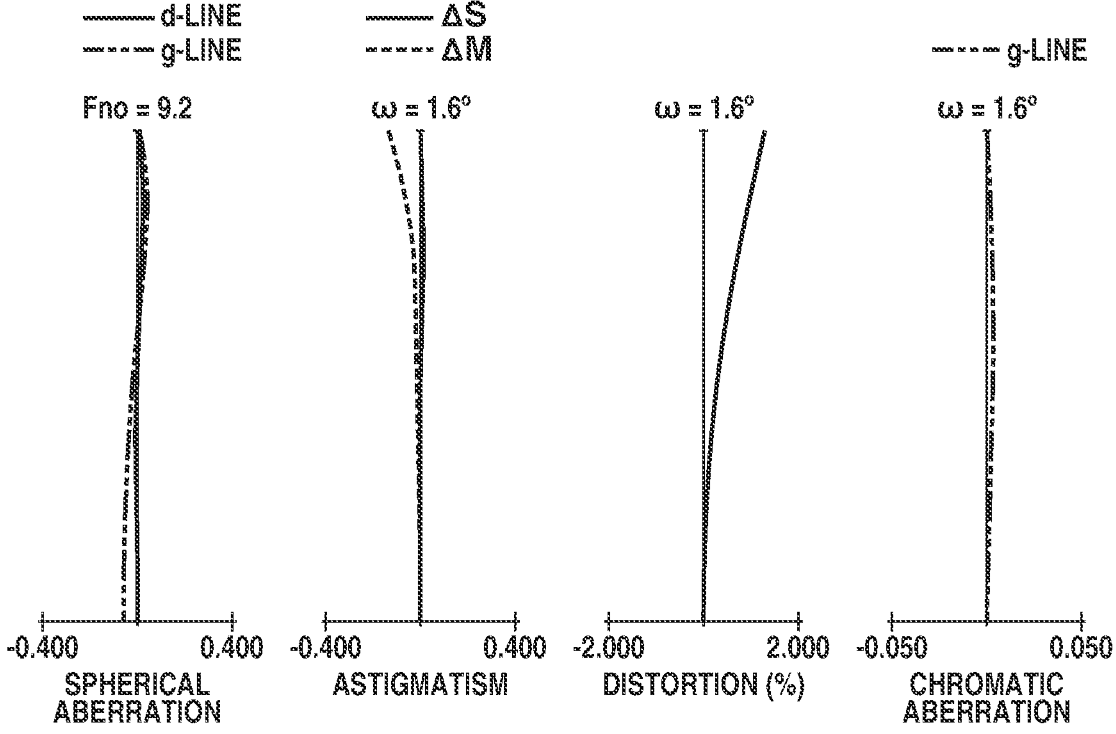
FIG. 8B is an aberration diagram at a telephoto end of the zoom lens according to the fourth exemplary embodiment.
Figure 9:
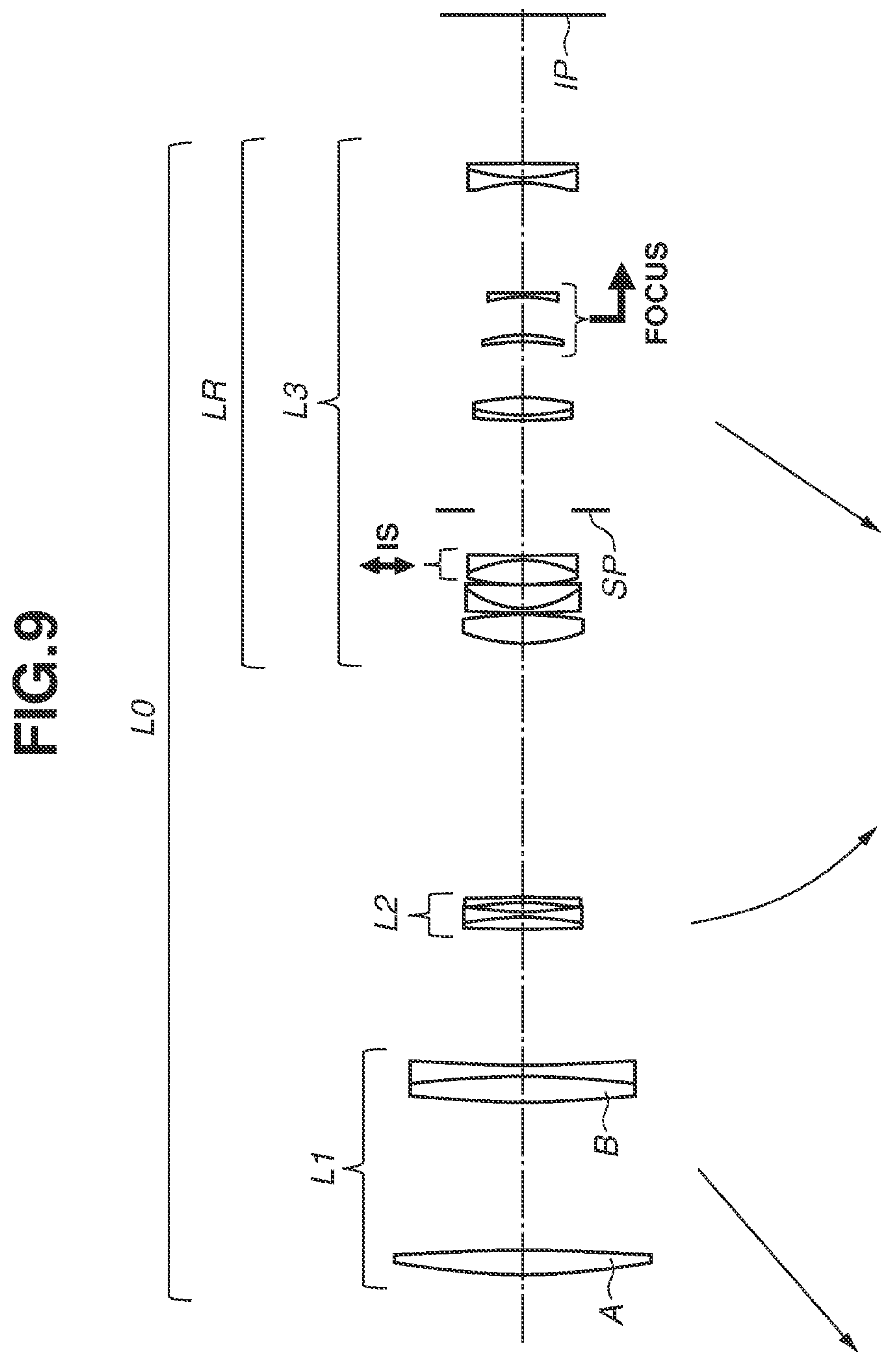
FIG. 9 is a cross-sectional view illustrating lenses at a wide angle end of a zoom lens according to a fifth exemplary embodiment.
Figure 10A:
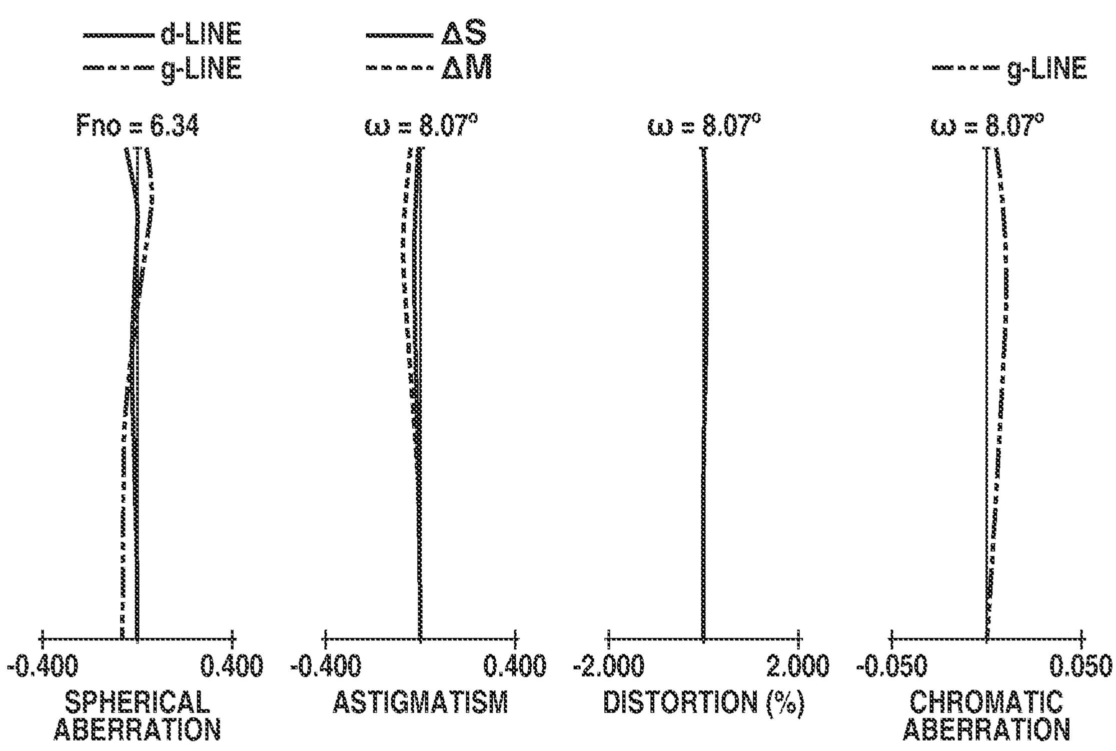
FIG. 10A is an aberration diagram at the wide angle end of the zoom lens according to the fifth exemplary embodiment.
Figure 10B:
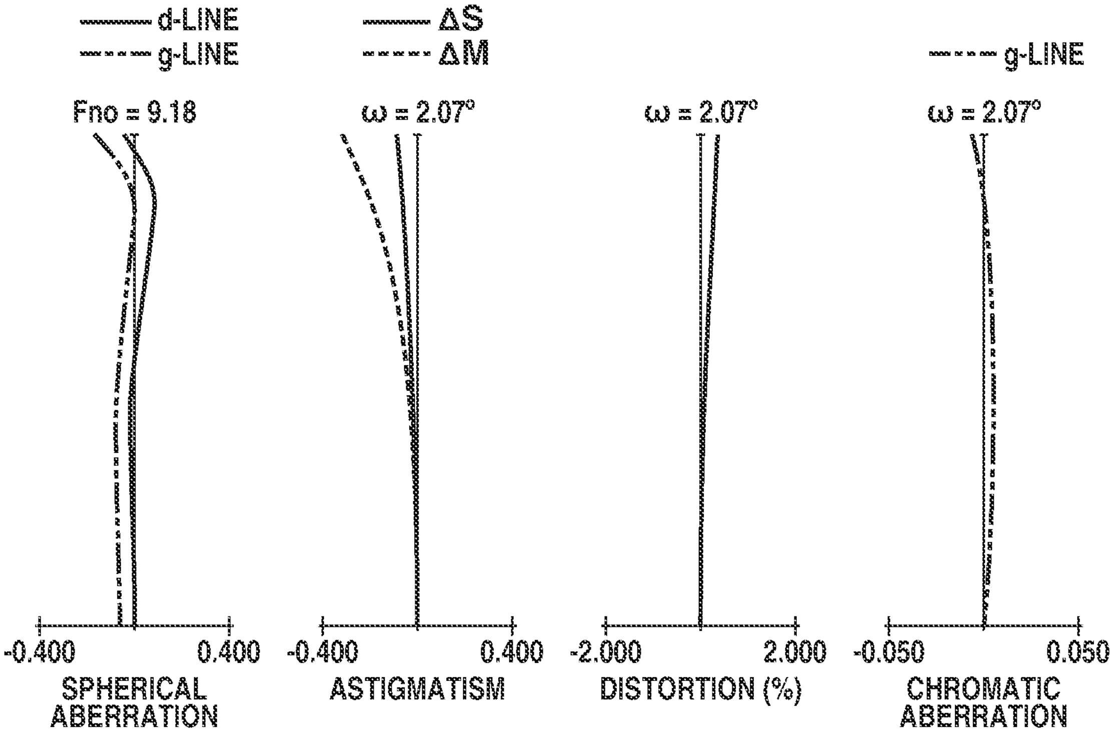
FIG. 10B is an aberration diagram at a telephoto end of the zoom lens according to the fifth exemplary embodiment.

Optical systems according to exemplary embodiments of the present invention and an example of an imaging apparatus including any of the optical systems will be described below with reference to the attached drawings.

FIGS. 1, 3, 5, 7, and 9 are cross-sectional views illustrating zoom lenses L0 according to first, second. third, fourth, and fifth exemplary embodiments, respectively. The zoom lenses L0 according to the exemplary embodiments are those used for imaging apparatuses, such as a digital video camera, a digital still camera, a broadcasting camera, a silver-halide film camera, a monitoring camera, and an on-vehicle camera.

In each of the cross-sectional views, the left side corresponds to an object side, and the right side corresponds to an image side. Each of the zoom lenses L0 according to the exemplary embodiments may also be used as a projection lens for a projector. In this case, the left side corresponds to a screen side, and the right side corresponds to a projected image side.

Each of the zoom lenses L0 according to the exemplary embodiments comprises a first lens unit L1 having positive refractive power, a second lens unit L2 having negative refractive power, and a rear lens group LR including one or more lens units. The first lens unit L1, the second lens unit L2, and the rear lens group LR are arranged in order from the object side to the image side. Intervals between the adjacent lens units change during zooming. Each of the lens units may include one lens or a plurality of lenses. Each of the lens units may also include an aperture stop.

In each of the cross-sectional views, each solid line arrow directed downward represents a moving locus of the corresponding lens unit during zooming from a wide angle end to a telephoto end. A focusing unit is moved as indicated by an arrow with the description of "FOCUS" during focusing from infinity to a close range. An image stabilizing unit is moved as indicated by a double-headed arrow with the description of "IS" during image shake correction.

Each of the cross-sectional views also illustrates an aperture stop SP and an image plane IP. In a case where each of the zoom lenses L0 according to the exemplary embodiments is used for a digital video camera or a digital still camera, an imaging plane of a solid-state image sensor (a photoelectric conversion device), such as a charge-coupled device (CCD) sensor or a complementary metal-oxide semiconductor (CMOS) sensor, is arranged on the image plane IP. In a case where each of the zoom lenses L0 according to the exemplary embodiments is used as an imaging optical system for a silver-halide film camera, a photosensitive surface corresponding to a film surface is arranged on the image plane IP.

In FIGS. 2A and 2B, 4A and 4B, 6A and 6B, 8A and 8B, and 10A and 10B are aberration diagrams in a case where a focus is achieved at an infinite object distance at the wide angle ends and telephoto ends of the zoom lenses L0 according to the first, second, third, fourth, and fifth exemplary embodiments, respectively.

In each spherical aberration chart, Fno represents a F-number, and spherical aberration amounts with respect to a d-line (with a wavelength of 587.6 nm) and a g-line (with a wavelength of 435.8 nm) are indicated. In each astigmatism chart, ΔS represents an aberration amount on a sagittal image plane, and ΔM represents an aberration amount on a meridional image plane. Each distortion aberration chart illustrates a distortion aberration amount with respect to the d-line. Each chromatic aberration chart illustrates a magnification chromatic aberration amount with respect to the g-line. Further, ω represents an imaging half angle of view (°).

Next, a characteristic configuration of each of the zoom lenses L0 according to the exemplary embodiments will be described.

In each of the zoom lenses L0 according to the exemplary embodiments, the first lens unit L1 has positive refractive power, whereby a principal point is arranged on the object side, and an overall lens length (a distance on an optical axis from a lens surface arranged closest to the object side in the zoom lens L0 to the image plane IP) is shortened. The second lens unit L2 has negative refractive power, whereby a magnification chromatic aberration that occurs in the first lens unit L1 especially at the wide angle end is corrected. Furthermore, the rear lens group LR including one or more lens units is arranged, whereby fluctuations of various aberrations that occur during zooming are suppressed.

The first lens unit L1 is moved toward the object side during zooming from the wide angle end to the telephoto end, whereby the overall lens length at the wide angle end is shortened.

The second lens unit L2 includes three or more lenses, whereby fluctuations of various aberrations that occur in the second lens unit L2 during zooming are suppressed.

Each of the zoom lenses L0 according to the exemplary embodiments is configured to satisfy the following inequalities (1) and (2):

$$4.3<TD12t/TG12<12.0 \quad (1)$$

$$3.6<TD1/TD2<30.0 \quad (2)$$

In the inequalities (1) and (2), TD12t is a distance on the optical axis from a lens surface arranged closest to the object side in the first lens unit L1 to a lens surface arranged closest to the image side in the second lens unit L2 at the telephoto end. TG12 is a total sum of thicknesses, on the optical axis, of lenses included in the first lens unit L1 and the second lens unit L2. TD1 is a distance on the optical axis from the lens surface arranged closest to the object side in the first lens unit L1 to a lens surface arranged closest to the image side in the first lens unit LL. TD2 is a distance on the optical axis from a lens surface arranged closest to the object side in the second lens unit L2 to the lens surface arranged closest to the image side in the second lens unit L2.

The inequalities (1) and (2) are to achieve correction of various aberrations, a high zoom ratio, and reduction in size and weight.

If TD12t/TG12 exceeds the upper limit of the inequality (1), the distance from the lens surface arranged closest to the object side in the first lens unit L1 to the lens surface arranged closest to the image side in the second lens unit L2 at the telephoto end becomes longer. As a result, the overall lens length becomes longer, which is not desirable. If TD12t/TG12 is less than the lower limit of the inequality (1), the total sum of the thicknesses, on the optical axis, of the lenses arranged in the first lens unit L1 and the second lens unit L2 increases. As a result, the weight of each lens included in the first lens unit L1 and the second lens unit L2 increases, which is not desirable.

If TD1/TD2 exceeds the upper limit of the inequality (2), the distance on the optical axis from the lens surface arranged closest to the object side in the first lens unit L1 to the lens surface arranged closest to the image side in the first lens unit L1 becomes longer. As a result, especially a diameter of a lens arranged closest to the object side becomes larger, which is not desirable. If TD1/TD2 is less than the lower limit of the inequality (2), the distance on the optical axis from the lens surface arranged closest to the object side in the second lens unit L2 to the lens surface arranged closest to the image side in the second lens unit L2 becomes longer. As a result, it is difficult to secure moving amounts of the second lens unit L2 and the rear lens group LR during zooming. This is not desirable because the overall lens length especially at the wide angle end is to be increased in order to obtain a desired zoom ratio.

The above-mentioned configuration can achieve a small, lightweight zoom lens offering high optical performance and a high zoom ratio.

At least one of the upper and lower limits of the value range of either the inequality (1) or the inequality (2) is desirably set to that of the corresponding one of the following inequalities (1a) and (2a):

$$4.5<TD12t/TG12<11.0 \quad (1a)$$

$$3.8<TD1/TD2<20.0 \quad (2a)$$

At least one of the upper and lower limits of the value range of either the inequality (1) or the inequality (2) is more desirably set to that of the corresponding one of the following inequalities (1b) and (2b):

$$4.7<TD12t/TG12<10.5 \quad (1b)$$

$$4.0<TD1/TD2<16.0 \quad (2b)$$

Next, a desirable configuration of each of the zoom lenses L0 according to the exemplary embodiments will be described.

The first lens unit L1 includes a positive lens A arranged closest to the object side and a positive lens B arranged adjacent to the positive lens A. The positive lenses A and B are desirably arranged with the largest air gap in the first lens unit L1 therebetween. The large air gap between the positive lenses A and B reduces an on-axis light flux that is incident on the positive lens B and lenses arranged closer to the image side than the positive lens B.

As a result, it is possible to reduce a diameter of the positive lens B and those of the lenses arranged closer to the image side than the positive lens B, thereby reducing the weight of the zoom lens L0.

Furthermore, in the first lens unit L1, a negative lens is desirably arranged closer to the image side than the positive lens B. The arrangement of the negative lens makes it is possible to appropriately correct aberrations, such as a spherical aberration and an on-axis chromatic aberration, especially at the telephoto end.

The second lens unit L2 is desirably fixed during zooming. This can reduce eccentricity of the second lens unit L2 that occurs during zooming, and can suppress fluctuations of various aberrations that occur in the second lens unit L2.

The aperture stop SP is desirably arranged between a lens surface arranged closest to the object side in a third lens unit L3 and a lens surface arranged closest to the image side in the third lens unit L3, or arranged closer to the image side than the third lens unit L3. Because an on-axis light flux incident on the third lens unit L3 or a lens arranged closer to the image side than the third lens unit L3 is relatively small, it is possible to reduce a diameter of the aperture stop SP.

Surfaces of all lenses included in the zoom lens L0 are desirably spherical in shape. Making the surfaces spherical in shape can suppress manufacturing variations, and can thereby prevent degradation of optical performance.

During image shake correction, the whole or part of the second lens unit L2 is desirably moved so as to contain a component in a direction perpendicular to the optical axis. Since the second lens unit L2 has relatively high negative refractive power, it is possible to increase an absolute value of eccentricity sensitivity, and prevent an increase in a diameter of a lens that is moved during image stabilization. The eccentricity sensitivity mentioned herein is a ratio ($\Delta 2/\Delta 1$) of a moving amount $\Delta 1$ of the lens and a moving amount $\Delta 2$ of an image forming point on the image plane IP in the direction perpendicular to the optical axis.

Next, inequalities (3) to (11) that are desirably satisfied by each of the zoom lenses L0 according to the exemplary embodiments will be described.

Each of the zoom lenses L0 according to the exemplary embodiments desirably satisfies at least one or more of the following inequalities (3) to (11):

$$0.1<m1/f1<0.5 \quad (3)$$

$$1.0<f1/fw<3.0 \quad (4)$$

$$-1.0<f2/fw<-0.2 \quad (5)$$

$$1.0<ft/TTDw<3.5 \quad (6)$$

$$8.0<ft/skw<35.0 \quad (7)$$

$$5.0<TTDw/skw<20.0 \quad (8)$$

$$0.4<D1max/TD1<0.9 \quad (9)$$

$$4.0<|(1-\beta ft^2)\beta rt^2|<20.0 \quad (10)$$

$$2.0<G1d<3.0 \quad (11)$$

In the inequalities (3) and (4), m1 is an absolute value of a moving amount of the first lens unit L1 during zooming from the wide angle end to the telephoto end, and f1 is a focal length of the first lens unit L1. In the inequalities (4) and (5), fw is a focal length of the entire system at the wide angle end, and f2 is a focal length of the second lens unit L2. In the inequalities (6) to (8), ft is a focal length of the entire system at the telephoto end, TTDw is a distance on the optical axis from the lens surface arranged closest to the object side to the image plane IP at the wide angle end, and skw is a back focus at the wide angle end.

In the inequality (9), D1max is the largest air gap on the optical axis in the first lens unit L1. In the inequality (10), βft is a lateral magnification, at the telephoto end, of the focusing unit that is moved during focusing, and Ort is a combined lateral magnification, at the telephoto end, of all the lens units arranged closer to the image side than the focusing unit. In the inequality (11), G1d is a specific gravity of a material of a lens arranged closest to the object side in the first lens unit L1.

Next, technical meanings of the inequalities (3) to (11) will be described.

If m1/f1 exceeds the upper limit of the inequality (3), and the absolute value of the moving amount of the first lens unit L1 during zooming from the wide angle end to the telephoto end becomes larger, each lens arranged in the first lens unit L1 increases in effective diameter in order to secure a peripheral light quantity at the telephoto end, and increases in weight. If m1/f1 is less than the lower limit of the inequality (3), and the refractive power of the first lens unit L1 becomes weaker, the principal point is arranged on the image side, and the overall lens length becomes longer.

If f1/fw exceeds the upper limit of the inequality (4), and the refractive power of the first lens unit L1 becomes weaker, the principal point is arranged on the image side, and the overall lens length becomes longer. If f1/fw is less than the lower limit of the inequality (4), and the refractive power of the first lens unit L1 becomes stronger, various aberrations that occur in the first lens unit L1 become larger.

If f2/fw exceeds the upper limit of the inequality (5), and the refractive power of the second lens unit L2 becomes stronger, fluctuations of various aberrations that occur in the second lens unit L2 during zooming become larger. If f2/fw is less than the lower limit of the inequality (5), and the refractive power of the second lens unit L2 becomes weaker, the moving amount of the second lens unit L2 during zooming becomes larger in order to obtain a desired zoom ratio. In other words, the overall lens length becomes longer in order to secure a space for the moving amount of the second lens unit L2 during zooming.

If ft/TTDw exceeds the upper limit of the inequality (6), and the focal length of the entire system at the telephoto end becomes longer, the refractive power of the first lens unit L1 or the like becomes stronger in order to prevent the increase of the overall lens length, which makes it difficult to correct various aberrations. If ft/TTDw is less than the lower limit of the inequality (6), the distance on the optical axis from the lens surface arranged closest to the object side to the image plane IP at the wide angle end becomes longer and the zoom lens L0 increases in size.

If ft/skw exceeds the upper limit of the inequality (7), and the focal length of the entire system at the telephoto end becomes longer, the refractive power of the first lens unit L1 or the like becomes stronger in order to prevent the increase of the overall lens length, which makes it difficult to correct various aberrations. If ft/skw is less than the lower limit of the inequality (7), the back focus at the wide angle end becomes longer. As a result, the overall lens length becomes longer.

If TTDw/skw exceeds the upper limit of the inequality (8), the distance on the optical axis from the lens surface arranged closest to the object side to the image plane IP at the wide angle end becomes longer, and the zoom lens L0 increases in size. If TTDw/skw is less than the lower limit of the inequality (8), and the distance on the optical axis from the lens surface arranged closest to the object side to the image plane IP at the wide angle end becomes shorter, the refractive power of the first lens unit L1 or the like becomes stronger, which makes it difficult to correct various aberrations.

If D1max/TD1 exceeds the upper limit of the inequality (9), and the largest air gap on the optical axis in the first lens unit L1 becomes larger, the lens arranged closest to the object side increases in diameter in order to secure the peripheral light quantity, and increases in weight. If D1max/TD1 is less than the lower limit of the inequality (9), and the largest air gap on the optical axis in the first lens unit L1 becomes smaller, especially the refractive power of the lens arranged closest to the object side becomes stronger, which makes it difficult to correct various aberrations.

The inequality (10) indicates position sensitivity of the focusing unit at the telephoto end. The position sensitivity mentioned herein is a ratio ($\Delta L/\Delta d$) of a moving amount $\Delta d$ of the focusing unit in the optical axis direction and a moving amount $\Delta L$ of the image forming position in the optical axis direction due to the movement of the focusing unit.

If $|(1-\beta ft^2)\beta rt^2|$ exceeds the upper limit of the inequality (10), and the position sensitivity of the focusing unit at the telephoto end becomes higher, the refractive power of the focusing unit becomes stronger, and fluctuations of various aberrations that occur during movement of the focusing unit become larger. If $|(1-\beta ft^2)\beta rt^2|$ is less than the lower limit of the inequality (10), and the position sensitivity of the focusing unit at the telephoto end becomes lower, the moving amount of the focusing unit increases during focusing. In other words, the overall lens length becomes longer in order to secure a space for the moving amount of the focusing unit during focusing.

If G1d exceeds the upper limit of the inequality (11), and the specific gravity of the material of the lens arranged closest to the object side in the first lens unit L1 becomes larger, the lens increases in weight. If G1d is less than the lower limit of the inequality (11) and the specific gravity of the material of the lens arranged closest to the object side in the first lens unit L1 becomes smaller, the material is relatively highly-dispersive, which makes it difficult to correct chromatic aberration.

At least one of the upper and lower limits of each of the inequalities (3) to (11) is desirably set to that of the corresponding one of the following inequalities (3a) to (11a):

$$0.2<m1/f1<0.4 \tag{3a}$$

$$1.2<f1/fw<2.7 \tag{4a}$$

$$-0.8<f2/fw<-0.25 \tag{5a}$$

$$1.2<ft/TTDw<3.0 \tag{6a}$$

$$12.0<ft/skw<30.0 \tag{7a}$$

$$6.0<TTDw/skw<15.0 \tag{8a}$$

$$0.5<D1\max/TD1<0.8 \tag{9a}$$

$$4.1<|(1-\beta ft^2)\times\beta rt^2|<15.0 \tag{10a}$$

$$2.35<G1d<2.55 \tag{11a}$$

At least one of the upper and lower limits of each of the inequalities (3) to (11) is more desirably set to that of the corresponding one of the following inequalities (3b) to (11b):

$$0.25<m1/f1<0.35 \tag{3b}$$

$$1.4<f1/fw<2.5 \tag{4b}$$

$$-0.6<f2/fw<-0.3 \tag{5b}$$

$$1.4<ft/TTDw<2.8 \tag{6b}$$

$$13.0<ft/skw<25.0 \tag{7b}$$

$$8.0<TTDw/skw<12.0 \tag{8b}$$

$$0.60<D1\ \max/TD1<0.75 \tag{9b}$$

$$4.2<|(1-\beta ft^2)\times\beta rt^2|<13.0 \tag{10b}$$

$$2.4<G1d<2.5 \tag{11b}$$

Next, the configuration of each of the zoom lenses L0 according to the exemplary embodiments will be described in detail.

The zoom lens L0 according to the first exemplary embodiment comprises the first lens unit L1 having positive refractive power, the second lens unit L2 having negative refractive power, and the rear lens group LR. The first lens unit L1, the second lens unit L2, and the rear lens group LR are arranged in order from the object side to the image side. The rear lens group LR comprises the third lens unit L3 having positive refractive power, a fourth lens unit L4 having positive refractive power, a fifth lens unit L5 having negative refractive power, and a sixth lens unit L6 having negative refractive power. The third lens unit L3, the fourth lens unit L4, the fifth lens unit L5, and the sixth lens unit L6 are arranged in order from the object side to the image side. With the appropriate arrangement of the lens units having negative refractive power and the lens units having positive refractive power, various aberrations in the entire zoom range are appropriately corrected.

The second lens unit L2 is fixed during zooming, whereby the occurrence of aberrations due to the eccentricity of the second lens unit L2 is suppressed. The second lens unit L2 includes three lenses of a positive lens, a negative lens, and a negative lens, which are arranged in order from the object side to the image side. The second lens unit L2 is moved in a direction substantially perpendicular to the optical axis, whereby image shake correction is performed. The second lens unit L2 includes the three lenses, whereby an eccentric aberration during image shake correction is suppressed.

The fifth lens unit L5 is moved toward the image side during focusing from infinity to a close distance. Moving the fifth lens unit L5 having a relatively small diameter during focusing enables high-speed focusing. The aperture stop SP that determines the F-number Fno is arranged closest to the image side in the third lens unit L3. The aperture stop SP is arranged closest to the image side in the third lens unit L3 having a relatively small diameter, whereby a diameter of the aperture stop SP can be made smaller.

The zoom lens L0 according to the second exemplary embodiment comprises the first lens unit L1 having positive refractive power, the second lens unit L2 having negative refractive power, and the rear lens group LR. The first lens unit L1, the second lens unit L2, and the rear lens group LR are arranged in order from the object side to the image side. The rear lens group LR comprises the third lens unit L3 having positive refractive power, the fourth lens unit L4 having negative refractive power, the fifth lens unit L5 having positive refractive power, and the sixth lens unit L6 having negative refractive power. The third lens unit L3, the fourth lens unit L4, the fifth lens unit L5, and the sixth lens unit L6 are arranged in order from the object side to the image side.

In the second exemplary embodiment, a positive lens is arranged closest to the image side in the first lens unit L1, in addition to the configuration according to the first exemplary embodiment. With the addition of the positive lens, a spherical aberration especially at the telephoto end is appropriately corrected.

The zoom lens L0 according to the third exemplary embodiment comprises the first lens unit L1 having positive refractive power, the second lens unit L2 having negative refractive power, and the rear lens group LR. The first lens unit L1, the second lens unit L2, and the rear lens group LR are arranged in order from the object side to the image side. The rear lens group LR comprises the third lens unit L3 having positive refractive power, the fourth lens unit L4 having negative refractive power, and the fifth lens unit L5 having negative refractive power. The third lens unit L3, the fourth lens unit L4, and the fifth lens unit L5 are arranged in order from the object side to the image side.

In the third exemplary embodiment, the second lens unit L2 includes two lenses, whereby the weight of the zoom lens L0 is reduced.

The zoom lens L0 according to the fourth exemplary embodiment comprises the first lens unit L1 having positive refractive power, the second lens unit L2 having negative refractive power, and the rear lens group LR. The first lens unit L1, the second lens unit L2, and the rear lens group LR are arranged in order from the object side to the image side. The rear lens group LR comprises the third lens unit L3 having positive refractive power, the fourth lens unit L4 having positive refractive power, and the fifth lens unit L5 having negative refractive power. The third lens unit L3, the fourth lens unit L4, and the fifth lens unit L5 are arranged in order from the object side to the image side.

In the fourth exemplary embodiment, the second lens unit L2 includes five lenses and the fifth lens unit L5 includes four lenses, whereby fluctuations of various aberrations that occur in the second lens unit L2 and the fifth lens unit L5 during zooming are suppressed. The fourth lens unit L4 is moved toward the object side during focusing from infinity to a close range.

The zoom lens L0 according to the fifth exemplary embodiment comprises the first lens unit L1 having positive refractive power, the second lens unit L2 having negative refractive power, and the rear lens group LR. The first lens unit L1, the second lens unit L2, and the rear lens group LR are arranged in order from the object side to the image side. The rear lens group LR comprises the third lens unit L3 having positive refractive power.

In the fifth exemplary embodiment, the number of lens units is made smaller than that in the first exemplary embodiment, and the configuration comprising three lens units suppresses eccentricity of each lens unit that occurs during zooming and improves optical performance.

First to fifth numerical examples corresponding to the first to fifth exemplary embodiments, respectively, will be described.

In surface data of each numerical example, r represents a curvature radius of each optical surface, d (mm) represents an on-axis interval (a distance on the optical axis) between an m-th surface and an (m+1)-th surface (m is a surface number counted from a light incident side). In addition, nd represents a refractive index of each optical member with respect to the d-line, and νd represents an Abbe number of each optical member. The Abbe number νd of a material is expressed by $\nu d=(Nd-1)/(NF-NC)$, where Nd, NF, an NC are refractive indices at Fraunhofer d-, F-, and C-lines (with wavelengths of 587.6 nm, 486.1 nm, and 656.3 nm), respectively.

First Numerical Example

Unit: mm

Surface Data

| Surface Number | r | d | nd | νd |
|---|---|---|---|---|
| 1 | 208.140 | 8.30 | 1.48749 | 70.2 |
| 2 | −575.227 | 39.20 | | |
| 3 | 117.400 | 11.35 | 1.49700 | 81.5 |
| 4 | −270.733 | 2.70 | 1.61340 | 44.3 |
| 5 | 154.413 | (variable) | | |
| 6 | −1313.396 | 3.50 | 1.80518 | 25.4 |
| 7 | −65.332 | 1.40 | 1.77250 | 49.6 |
| 8 | 114.681 | 2.08 | | |
| 9 | −137.293 | 1.40 | 1.83481 | 42.7 |
| 10 | 893.658 | (variable) | | |
| 11 | 48.839 | 8.05 | 1.49700 | 81.5 |
| 12 | −79.168 | 0.55 | | |
| 13 | 301.466 | 1.35 | 1.77250 | 49.6 |
| 14 | 27.972 | 5.77 | 1.54072 | 47.2 |
| 15 | 776.993 | 0.48 | | |
| 16 | 93.677 | 6.14 | 1.51823 | 58.9 |
| 17 | −33.663 | 1.30 | 1.77250 | 49.6 |
| 18 | −558.826 | 6.04 | | |
| 19 (aperture) | ∞ | (variable) | | |
| 20 | 71.179 | 1.30 | 2.00069 | 25.5 |
| 21 | 35.239 | 4.65 | 1.61340 | 44.3 |
| 22 | −67.501 | (variable) | | |
| 23 | 112.661 | 2.56 | 1.51742 | 52.4 |
| 24 | −88.341 | 1.22 | | |
| 25 | −100.206 | 0.90 | 1.59522 | 67.7 |
| 26 | 29.728 | (variable) | | |
| 27 | −43.800 | 1.30 | 1.49700 | 81.5 |
| 28 | 43.800 | 4.30 | 1.72047 | 34.7 |
| 29 | −576.993 | (variable) | | |
| Image Plane | ∞ | | | |

Various Data

| Zoom ratio | 3.82 | | |
|---|---|---|---|
| | Wide Angle | Intermediate | Telephoto |
| Focal Length | 203.00 | 390.84 | 776.00 |
| F-number | 6.42 | 7.30 | 9.18 |
| Half-Angle of View | 6.08 | 3.17 | 1.60 |
| Image Height | 21.64 | 21.64 | 21.64 |
| Overall Lens Length | 331.63 | 390.98 | 421.61 |
| BF | 37.98 | 61.62 | 96.27 |
| d5 | 39.49 | 98.84 | 129.47 |
| d10 | 43.89 | 32.37 | 3.29 |
| d19 | 46.32 | 45.47 | 47.31 |
| d22 | 21.38 | 12.89 | 3.01 |

| Unit: mm | | | |
|---|---|---|---|
| d26 | 26.74 | 23.95 | 26.42 |
| d29 | 37.98 | 61.62 | 96.27 |

Zoom Lens Unit Data

| Unit | Starting Surface | Focal Length |
|---|---|---|
| L1 | 1 | 302.68 |
| L2 | 6 | −71.48 |
| L3 | 11 | 99.38 |
| L4 | 20 | 82.71 |
| L5 | 23 | −66.78 |
| L6 | 27 | −203.48 |

Second Numerical Example

Unit: mm

Surface Data

| Surface Number | r | d | nd | vd |
|---|---|---|---|---|
| 1 | 144.748 | 9.32 | 1.48749 | 70.2 |
| 2 | ∞ | 48.43 | | |
| 3 | 89.287 | 10.89 | 1.49700 | 81.6 |
| 4 | −847.726 | 3.00 | 1.61340 | 44.3 |
| 5 | 74.191 | 1.97 | | |
| 6 | 100.080 | 4.93 | 1.51823 | 58.9 |
| 7 | 174.640 | (variable) | | |
| 8 | ∞ | 4.76 | 1.65412 | 39.7 |
| 9 | −63.154 | 2.00 | 1.58913 | 61.1 |
| 10 | 767.732 | 3.37 | | |
| 11 | 682.775 | 1.50 | 1.72916 | 54.7 |
| 12 | 82.889 | 2.86 | | |
| 13 | −101.488 | 1.50 | 1.69680 | 55.5 |
| 14 | 101.488 | 3.53 | 1.78472 | 25.7 |
| 15 | ∞ | (variable) | | |
| 16 | 49.739 | 7.15 | 1.49700 | 81.6 |
| 17 | −138.331 | 0.19 | | |
| 18 | 64.996 | 1.70 | 1.72916 | 54.7 |
| 19 | 27.598 | 9.12 | 1.53775 | 74.7 |
| 20 | −231.045 | 0.97 | | |
| 21 | −86.744 | 1.90 | 1.90525 | 35.0 |
| 22 | 1464.098 | 16.96 | | |
| 23 (aperture) | ∞ | 24.36 | | |
| 24 | 64.330 | 4.61 | 1.61340 | 44.3 |
| 25 | −43.939 | 1.30 | 1.89190 | 37.1 |
| 26 | −157.290 | (variable) | | |
| 27 | 271.506 | 2.33 | 1.85478 | 24.8 |
| 28 | −74.228 | 1.00 | 1.83481 | 42.7 |
| 29 | 39.368 | (variable) | | |
| 30 | 67.122 | 1.70 | 1.92286 | 20.9 |
| 31 | 38.251 | 6.33 | 1.65412 | 39.7 |
| 32 | −60.563 | (variable) | | |
| 33 | −76.617 | 1.30 | 1.59522 | 67.7 |
| 34 | 166.663 | 1.15 | | |
| 35 | −165.426 | 1.50 | 1.59522 | 67.7 |
| 36 | 23.838 | 6.86 | 1.61340 | 44.3 |
| 37 | 181.816 | (variable) | | |
| Image Plane | ∞ | | | |

Various Data

Zoom Ratio 3.7

| | Wide Angle | Intermediate | Telephoto |
|---|---|---|---|
| Focal Length | 206.00 | 384.91 | 778.20 |
| F-number | 5.71 | 6.70 | 9.18 |
| Half-Angle of View | 6.00 | 3.22 | 1.59 |
| Image Height | 21.64 | 21.64 | 21.64 |
| Overall Lens Length | 330.11 | 387.57 | 420.11 |
| BF | 40.03 | 58.26 | 96.02 |

| Unit: mm | | | |
|---|---|---|---|
| d7 | 7.95 | 65.40 | 97.95 |
| d15 | 41.76 | 29.34 | 2.97 |
| d26 | 15.09 | 8.51 | 3.09 |
| d29 | 17.80 | 24.37 | 29.79 |
| d32 | 18.99 | 13.18 | 1.79 |
| d37 | 40.03 | 58.26 | 96.02 |

Zoom Lens Unit Data

| Unit | Starting Surface | Focal Length |
|---|---|---|
| L1 | 1 | 298.92 |
| L2 | 8 | −73.88 |
| L3 | 16 | 72.61 |
| L4 | 27 | −56.61 |
| L5 | 30 | 58.15 |
| L6 | 33 | −55.76 |

Third Numerical Example

Unit: mm

Surface Data

| Surface Number | r | d | nd | vd |
|---|---|---|---|---|
| 1 | 276.825 | 6.18 | 1.48749 | 70.2 |
| 2 | −600.775 | 39.20 | | |
| 3 | 119.101 | 7.36 | 1.49700 | 81.5 |
| 4 | −496.322 | 2.70 | 1.61340 | 44.3 |
| 5 | 164.850 | (variable) | | |
| 6 | −189.115 | 2.24 | 1.80518 | 25.4 |
| 7 | −66.169 | 1.40 | 1.77250 | 49.6 |
| 8 | 121.138 | (variable) | | |
| 9 | 51.485 | 7.45 | 1.49700 | 81.5 |
| 10 | −90.684 | 1.12 | | |
| 11 | 380.120 | 1.35 | 1.77250 | 49.6 |
| 12 | 30.296 | 5.13 | 1.54072 | 47.2 |
| 13 | 443.836 | 0.73 | | |
| 14 | 110.891 | 5.53 | 1.51823 | 58.9 |
| 15 | −37.072 | 1.30 | 1.77250 | 49.6 |
| 16 | −296.706 | 9.32 | | |
| 17 (aperture) | ∞ | 41.15 | | |
| 18 | 66.591 | 1.30 | 2.00069 | 25.5 |
| 19 | 34.650 | 3.94 | 1.61340 | 44.3 |
| 20 | −83.966 | (variable) | | |
| 21 | 93.250 | 2.61 | 1.51742 | 52.4 |
| 22 | −71.258 | 1.88 | | |
| 23 | −69.994 | 0.90 | 1.59522 | 67.7 |
| 24 | 28.582 | (variable) | | |
| 25 | −179.806 | 1.30 | 1.49700 | 81.5 |
| 26 | 30.669 | 3.65 | 1.72047 | 34.7 |
| 27 | 75.036 | (variable) | | |
| Image Plane | ∞ | | | |

Various Data

Zoom Ratio 2.46

| | Wide Angle | Intermediate | Telephoto |
|---|---|---|---|
| Focal Length | 203.01 | 395.08 | 500.04 |
| F-number | 6.43 | 8.04 | 9.18 |
| Half-Angle of View | 6.08 | 3.13 | 2.48 |
| Image Height | 21.64 | 21.64 | 21.64 |
| Overall Lens Length | 321.37 | 404.17 | 420.39 |
| BF | 37.99 | 62.27 | 74.98 |
| d5 | 39.40 | 122.19 | 138.42 |
| d8 | 49.99 | 41.02 | 32.90 |
| d20 | 17.25 | 6.96 | 3.00 |
| d24 | 28.99 | 23.97 | 23.34 |
| d27 | 37.99 | 62.27 | 74.98 |

-continued

| Unit: mm | | |
|---|---|---|
| Unit | Starting Surface | Focal Length |
| L1 | 1 | 342.38 |
| L2 | 6 | −98.13 |
| L3 | 9 | 76.09 |
| L4 | 21 | −64.30 |
| L5 | 25 | −200.31 |

Fourth Numerical Example

Unit: mm

Surface Data

| Surface Number | r | d | nd | vd |
|---|---|---|---|---|
| 1 | 141.629 | 9.15 | 1.51823 | 58.9 |
| 2 | 7683.053 | 46.38 | | |
| 3 | 114.796 | 9.86 | 1.49700 | 81.5 |
| 4 | −395.656 | 2.70 | 1.61340 | 44.3 |
| 5 | 80.183 | 1.45 | | |
| 6 | 101.475 | 5.71 | 1.49700 | 81.5 |
| 7 | 193.888 | (variable) | | |
| 8 | 56.915 | 5.47 | 1.59270 | 35.3 |
| 9 | 2310.622 | 0.97 | | |
| 10 | 245.283 | 1.65 | 1.83481 | 42.7 |
| 11 | 59.448 | 3.29 | | |
| 12 | 119.146 | 1.65 | 1.71989 | 55.4 |
| 13 | 74.599 | 3.31 | | |
| 14 | −108.591 | 1.65 | 1.65394 | 60.9 |
| 15 | 89.528 | 2.66 | 1.84666 | 23.8 |
| 16 | 185.266 | (variable) | | |
| 17 | 81.580 | 5.72 | 1.49700 | 81.5 |
| 18 | −103.333 | 0.20 | | |
| 19 | 61.959 | 6.95 | 1.49700 | 81.5 |
| 20 | −70.310 | 1.80 | 1.90043 | 37.4 |
| 21 | 252.967 | 30.62 | | |
| 22 (aperture) | ∞ | 4.93 | | |
| 23 | −35.634 | 1.30 | 1.60311 | 60.6 |
| 24 | 44.939 | 6.76 | 1.52584 | 49.7 |
| 25 | −32.909 | 0.20 | | |
| 26 | −43.510 | 1.95 | 1.48749 | 70.2 |
| 27 | −37.860 | (variable) | | |
| 28 | 155.017 | 5.70 | 1.57714 | 42.3 |
| 29 | −23.967 | 1.20 | 1.95375 | 32.3 |
| 30 | −60.504 | 2.43 | | |
| 31 | −31.133 | 2.56 | 1.58896 | 35.9 |
| 32 | −26.486 | (variable) | | |
| 33 | −106.469 | 1.00 | 1.53775 | 74.7 |
| 34 | 19.932 | 5.81 | 1.51653 | 52.8 |
| 35 | 122.631 | 3.44 | | |
| 36 | −50.383 | 1.50 | 1.49700 | 81.5 |
| 37 | 30.867 | 5.46 | 1.51257 | 54.7 |
| 38 | −294.673 | (variable) | | |
| Image Plane | ∞ | | | |

Various Data

Zoom Ratio 3.77

| | Wide Angle | Intermediate | Telephoto |
|---|---|---|---|
| Focal Length | 206.02 | 384.95 | 775.89 |
| F-number | 5.77 | 6.80 | 9.20 |
| Half-Angle of View | 5.99 | 3.22 | 1.60 |
| Image Height | 21.64 | 21.64 | 21.64 |
| Overall Lens Length | 326.81 | 380.44 | 419.36 |
| BF | 31.57 | 53.56 | 91.89 |
| d7 | 8.62 | 62.25 | 101.18 |
| d26 | 44.19 | 28.14 | 2.21 |
| d27 | 18.16 | 26.33 | 35.76 |
| d32 | 38.86 | 24.76 | 2.93 |
| d38 | 31.57 | 53.56 | 91.89 |

-continued

Unit: mm

Zoom Lens Unit Data

| Unit | Starting Surface | Focal Length |
|---|---|---|
| L1 | 1 | 342.32 |
| L2 | 8 | −89.16 |
| L3 | 17 | 102.74 |
| L4 | 28 | 130.20 |
| L5 | 33 | −54.45 |

Fifth Numerical Example

Unit: mm

Surface Data

| Surface Number | r | d | nd | vd |
|---|---|---|---|---|
| 1 | 218.302 | 5.89 | 1.48749 | 70.2 |
| 2 | −738.944 | 39.20 | | |
| 3 | 251.266 | 6.97 | 1.49700 | 81.5 |
| 4 | −222.883 | 2.70 | 1.61340 | 44.3 |
| 5 | 337.588 | (variable) | | |
| 6 | 453.827 | 3.22 | 1.80518 | 25.4 |
| 7 | −79.739 | 1.40 | 1.77250 | 49.6 |
| 8 | 100.533 | 2.43 | | |
| 9 | −89.220 | 1.40 | 1.83481 | 42.7 |
| 10 | −393.480 | (variable) | | |
| 11 | 44.461 | 7.61 | 1.49700 | 81.5 |
| 12 | −88.855 | 0.55 | | |
| 13 | 216.893 | 1.35 | 1.77250 | 49.6 |
| 14 | 25.104 | 5.51 | 1.54072 | 47.2 |
| 15 | 200.999 | 0.45 | | |
| 16 | 61.022 | 6.50 | 1.51823 | 58.9 |
| 17 | −32.801 | 1.30 | 1.77250 | 49.6 |
| 18 | 912.404 | 11.86 | | |
| 19 (aperture) | ∞ | 23.62 | | |
| 20 | 134.867 | 1.30 | 2.00069 | 25.5 |
| 21 | 50.424 | 4.79 | 1.61340 | 44.3 |
| 22 | −57.225 | 14.54 | | |
| 23 | −67.250 | 1.98 | 1.51742 | 52.4 |
| 24 | −38.172 | 10.00 | | |
| 25 | −33.025 | 0.90 | 1.59522 | 67.7 |
| 26 | −6071.683 | 29.02 | | |
| 27 | −40.861 | 1.30 | 1.49700 | 81.5 |
| 28 | 49.832 | 3.84 | 1.72047 | 34.7 |
| 29 | −471.630 | (variable) | | |
| Image Plane | ∞ | | | |

Various Data

Zoom Ratio 3.93

| | Wide Angle | Intermediate | Telephoto |
|---|---|---|---|
| Focal Length | 152.68 | 299.59 | 600.00 |
| F-number | 6.34 | 8.05 | 9.18 |
| Half-Angle of view | 8.07 | 4.13 | 2.07 |
| Image Height | 21.64 | 21.64 | 21.64 |
| Overall Lens Length | 331.63 | 386.74 | 427.64 |
| BF | 39.31 | 65.54 | 82.78 |
| d5 | 35.90 | 93.92 | 153.22 |
| d10 | 66.79 | 37.64 | 2.00 |
| d29 | 39.31 | 65.54 | 82.78 |

Zoom Lens Unit Data

| Unit | Starting Surface | Focal Length |
|---|---|---|
| L1 | 1 | 379.81 |
| L2 | 6 | −78.52 |
| L3 | 11 | 62.16 |

Table 1 indicates various kinds of values according to the above-described exemplary embodiments.

TABLE 1

| | Expression | 1st Exemplary Embodiment | 2nd Exemplary Embodiment | 3rd Exemplary Embodiment | 4th Exemplary Embodiment | 5th Exemplary Embodiment |
|---|---|---|---|---|---|---|
| Inequality (1) | TD12t/TG12 | 6.960 | 4.731 | 9.936 | 4.867 | 10.030 |
| Inequality (2) | TD1/TD2 | 7.348 | 4.022 | 15.245 | 3.645 | 6.479 |
| Inequality (3) | m1/f1 | 0.297 | 0.301 | 0.289 | 0.270 | 0.253 |
| Inequality (4) | f1/fw | 1.491 | 1.451 | 1.686 | 1.662 | 2.488 |
| Inequality (5) | f2/fw | −0.352 | −0.359 | −0.483 | −0.433 | −0.514 |
| Inequality (6) | ft/TTDw | 2.340 | 2.357 | 1.556 | 2.374 | 1.809 |
| Inequality (7) | ft/skw | 20.433 | 19.439 | 13.164 | 24.576 | 15.265 |
| Inequality (8) | TTDw/skw | 8.733 | 8.246 | 8.460 | 10.351 | 8.437 |
| Inequality (9) | D1max/TD1 | 0.637 | 0.617 | 0.707 | 0.616 | 0.716 |
| Inequality (10) | $\|(1-\beta ft^2)\beta rt^2\|$ | 10.261 | 10.400 | 7.447 | 4.299 | 6.023 |
| Inequality (11) | G1d | 2.460 | 2.460 | 2.460 | 2.480 | 2.460 |
| | TD12t | 199.399 | 196.009 | 197.496 | 197.065 | 216.434 |
| | TG12 | 28.650 | 41.427 | 19.878 | 40.491 | 21.579 |
| | TD1 | 61.550 | 78.536 | 55.441 | 75.245 | 54.762 |
| | TD2 | 8.377 | 19.526 | 3.637 | 20.644 | 8.452 |
| | m1 | 89.979 | 90.001 | 99.021 | 92.553 | 96.003 |
| | f1 | 302.680 | 298.915 | 342.378 | 342.325 | 379.811 |
| | f2 | −71.481 | −73.881 | −98.129 | −89.157 | −78.520 |
| | fw | 203.002 | 206.000 | 203.012 | 206.021 | 152.679 |
| | ft | 775.996 | 778.200 | 500.042 | 775.890 | 599.999 |
| | TTDw | 331.633 | 330.112 | 321.374 | 326.807 | 331.633 |
| | skw | 37.977 | 40.033 | 37.987 | 31.572 | 39.306 |
| | D1max | 39.200 | 48.433 | 39.200 | 46.385 | 39.200 |
| | βft | 2.360 | 4.184 | 2.233 | 0.685 | 1.891 |
| | βrt | 1.498 | 0.794 | 1.367 | 2.845 | 1.529 |

[Imaging Apparatus]

Figure 11:
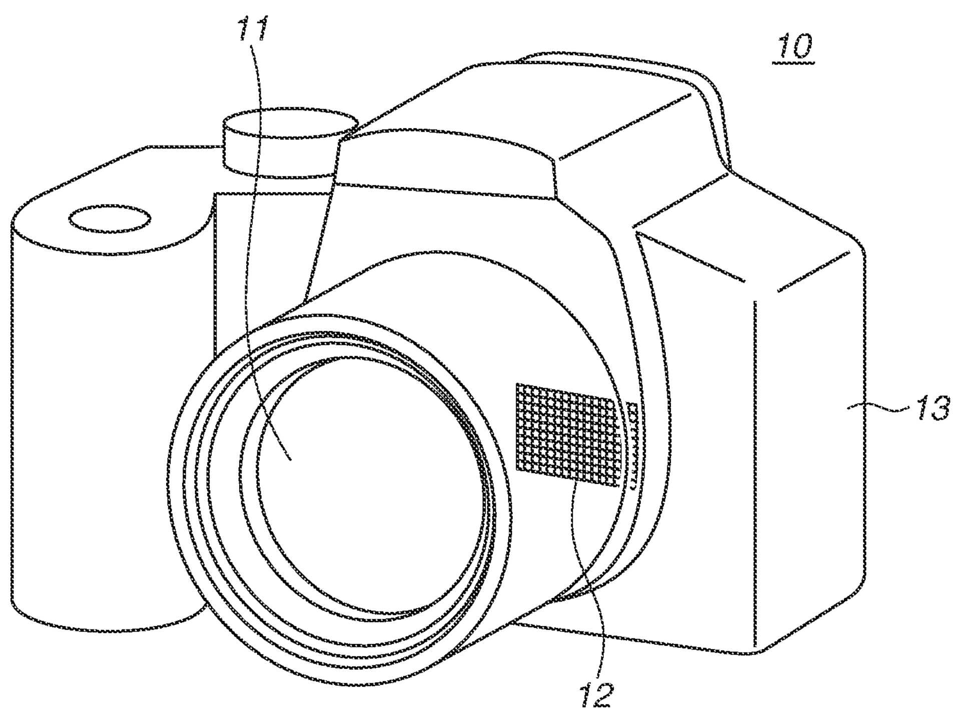
FIG. 11 is a schematic view of an imaging apparatus.

Next, an example of a digital still camera (an imaging apparatus) using the zoom lens L0 according to any of the exemplary embodiments of the present invention as an imaging optical system will be described with reference to FIG. 11. FIG. 11 illustrates an imaging optical system 11 using any of the zoom lenses L0 described in the first to fifth exemplary embodiments. An image pickup device (a photoelectric conversion device) 12, such as a charge-coupled device (CCD) sensor or a complementary metal-oxide semiconductor (CMOS) sensor, is built into a camera body 10, receives an optical image formed by the imaging optical system 11, and photoelectrically converts the optical image. The camera body 10 may be a single-lens reflex camera including a quick turn mirror, or a mirrorless camera without the quick turn mirror.

In this manner, applying the zoom lens L0 according to any of the exemplary embodiments of the present invention to an imaging apparatus, such as a digital still camera, enables obtaining high-resolution, wide-angle images.

While the exemplary embodiments and examples of the present invention have been described above, the present invention is not limited to these exemplary embodiments and examples, and can be combined, modified, and changed in various manners without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-170052, filed Oct. 24, 2022, which is hereby incorporated by reference herein in its entirety.

What is claimed is:

1. A zoom lens comprising a first lens unit having positive refractive power, a second lens unit having negative refractive power, and a rear lens group including one or more lens units, the first lens unit, the second lens unit, and the rear lens group being arranged in order from an object side to an image side, wherein intervals between adjacent lens units change during zooming, wherein the first lens unit is configured to move toward the object side during zooming from a wide angle end to a telephoto end, wherein the second lens unit includes three or more lenses, and wherein the following inequalities are satisfied:

$$4.3<TD12t/TG12<12.0, \text{ and}$$

$$3.6<TD1/TD2<30.0,$$

where TD12t is a distance on an optical axis from a lens surface arranged closest to the object side in the first lens unit to a lens surface arranged closest to the image side in the second lens unit at the telephoto end, TG12 is a total sum of thicknesses, on the optical axis, of lenses included in the first lens unit and the second lens unit, TD1 is a distance on the optical axis from the lens surface arranged closest to the object side in the first lens unit to a lens surface arranged closest to the image side in the first lens unit, and TD2 is a distance on the optical axis from a lens surface arranged closest to the object side in the second lens unit to the lens surface arranged closest to the image side in the second lens unit.

2. The zoom lens according to claim 1, wherein the following inequality is satisfied:

$$0.1<m1/f1<0.5,$$

where m1 is an absolute value of a moving amount of the first lens unit during the zooming from the wide angle end to the telephoto end, and f1 is a focal length of the first lens unit.

3. The zoom lens according to claim 1, wherein the following inequality is satisfied:

$$1.0<f1/fw<3.0,$$

where f1 is a focal length of the first lens unit, and fw is a focal length of an entire system at the wide angle end.

4. The zoom lens according to claim 1, wherein the following inequality is satisfied:

$$-1.0<f2/fw<-0.2,$$

where f2 is a focal length of the second lens unit, and fw is a focal length of an entire system at the wide angle end.

5. The zoom lens according to claim 1, wherein the following inequality is satisfied:

$$1.0<ft/TTDw<3.5,$$

where ft is a focal length of an entire system at the telephoto end, and TTDw is a distance on the optical axis from a lens surface arranged closest to the object side to an image plane at the wide angle end.

6. The zoom lens according to claim 1, wherein the following inequality is satisfied:

$$8.0<ft/skw<35.0,$$

where ft is a focal length of an entire system at the telephoto end, and skw is a back focus at the wide angle end.

7. The zoom lens according to claim 1, wherein the following inequality is satisfied:

$$5.0<TTDw/skw<20.0,$$

where TTDw is a distance on the optical axis from a lens surface arranged closest to the object side to an image plane at the wide angle end, and skw is a back focus at the wide angle end.

8. The zoom lens according to claim 1, wherein the following inequality is satisfied:

$$0.4<D1max/TD1<0.9,$$

where D1max is a largest air gap on the optical axis in the first lens unit.

9. The zoom lens according to claim 1, further comprising a focusing unit configured to move during focusing, wherein the following inequality is satisfied:

$$4.0<|(1-\beta ft^2)\times\beta rt^2|<20.0,$$

where βft is a lateral magnification of the focusing unit at the telephoto end, and Ort is a combined lateral magnification of all the lens units arranged closer to the image side than the focusing unit at the telephoto end.

10. The zoom lens according to claim 1, wherein the following inequality is satisfied:

$$2.0<G1d<3.0,$$

where G1d is a specific gravity of a material of a lens arranged closest to the object side in the first lens unit.

11. The zoom lens according to claim 1, wherein the first lens unit includes a positive lens A arranged closest to the object side and a positive lens B arranged adjacent to the positive lens A, and wherein the positive lens A and the positive lens B are arranged with a largest air gap on the optical axis in the first lens unit therebetween.

12. The zoom lens according to claim 11, wherein the first lens unit includes the positive lens A, the positive lens B, and a negative lens that are arranged in the order from the object side to the image side.

13. The zoom lens according to claim 1, wherein the second lens unit is fixed during zooming.

14. The zoom lens according to claim 1, wherein the rear lens group comprises a third lens unit having positive refractive power, a fourth lens unit having positive refractive power, a fifth lens unit having negative refractive power, and a sixth lens unit having negative refractive power.

15. The zoom lens according to claim 1, wherein the rear lens group comprises a third lens unit having positive refractive power, a fourth lens unit having negative refractive power, a fifth lens unit having positive refractive power, and a sixth lens unit having negative refractive power.

16. The zoom lens according to claim 1, wherein the rear lens group comprises a third lens unit having positive refractive power, a fourth lens unit having negative refractive power, and a fifth lens unit having negative refractive power.

17. The zoom lens according to claim 1, wherein the rear lens group comprises a third lens unit having positive refractive power, a fourth lens unit having positive refractive power, and a fifth lens unit having negative refractive power.

18. The zoom lens according to claim 1, wherein the rear lens group comprises a third lens unit having positive refractive power.

19. The zoom lens according to claim 1, further comprising an aperture stop that is arranged between a lens surface arranged closest to the object side in a third lens unit and a lens surface arranged closest to the image side in the third lens unit, or arranged closer to the image side than the third lens unit, wherein the third lens unit is included in the rear lens group.

20. The zoom lens according to claim 1, wherein surfaces of all lenses included in the zoom lens are spherical in shape.

21. The zoom lens according to claim 1, wherein a whole or part of the second lens unit is configured to move so as to contain a component in a direction perpendicular to the optical axis during image shake correction.

22. An imaging apparatus comprising:

a zoom lens comprising a first lens unit having positive refractive power, a second lens unit having negative refractive power, and a rear lens group including one or more lens units, the first lens unit, the second lens unit, and the rear lens group being arranged in order from an object side to an image side, wherein intervals between adjacent lens units change during zooming, wherein the first lens unit is configured to move toward the object side during zooming from a wide angle end to a telephoto end, wherein the second lens unit includes three or more lenses, and wherein the following inequalities are satisfied:

$$4.3<TD12t/TG12<12.0, \text{ and}$$

$$3.6<TD1/TD2<30.0,$$

where TD12t is a distance on an optical axis from a lens surface arranged closest to the object side in the first lens unit to a lens surface arranged closest to the image side in the second lens unit at the telephoto end, TG12 is a total sum of thicknesses, on the optical axis, of lenses included in the first lens unit and the second lens unit, TD1 is a distance on the optical axis from the lens surface arranged closest to the object side in the first lens unit to a lens surface arranged closest to the image side in the first lens unit, and TD2 is a distance on the optical axis from a lens surface arranged closest to the object side in the second lens unit to the lens surface arranged closest to the image side in the second lens unit; and an image sensor configured to receive an optical image formed by the zoom lens.

* * * * *